US007693777B1

(12) United States Patent
Holmes et al.

(10) Patent No.: US 7,693,777 B1
(45) Date of Patent: Apr. 6, 2010

(54) COMPUTERIZED TRADING SYSTEM

(75) Inventors: Simon Marcus Ashworth Holmes, London (GB); Kieron Louis Michael Nolan, London (GB); Phillip Haynes, Sydney (AU)

(73) Assignee: Patshare Limited, London (GB)

( * ) Notice: Subject to any disclaimer, the term of this patent is extended or adjusted under 35 U.S.C. 154(b) by 183 days.

(21) Appl. No.: 11/520,742

(22) Filed: Sep. 14, 2006

Related U.S. Application Data

(63) Continuation of application No. 11/323,943, filed on Dec. 29, 2005, now abandoned.

(51) Int. Cl.
*G06Q 40/00* (2006.01)
(52) U.S. Cl. ....................................................... 705/37
(58) Field of Classification Search .................. 705/37
See application file for complete search history.

(56) References Cited

U.S. PATENT DOCUMENTS 6,304,858 B1 * 10/2001 Mosler et al. ................. 705/37

2006/0224492 A1 * 10/2006 Pinkava ....................... 705/37

OTHER PUBLICATIONS

"Synthetic Swap Spreads with CBOT Swap Futures," Chicago Board of Trade, www.cbot.com, retrieved from the Internet Archive collection from Mar. 8, 2005.*
"Trading 10-Year Term TED Spreads," Chicago Board of Trade, www.cbot.com, retrieved from the Internet Archive collection from Dec. 6, 2004.*

* cited by examiner

*Primary Examiner*—Charles R Kyle
*Assistant Examiner*—David L Wood
(74) *Attorney, Agent, or Firm*—Dickstein Shapiro LLP

(57) ABSTRACT

The present invention relates to computerized trading systems and associated methods, particularly those that implement trades in basis trading where the two instruments have different and non-universally agreed pricing mechanisms and metrics, such as futures crosses in the European derivative markets. The present invention allows traders to enter orders expressed in terms of their own metrics. These orders are then converted to be expressed according to a standardized metric such that comparisons may be made and orders matched. Once matching orders are identified, these orders can be reported back to the traders, expressed in terms of their own metrics.

48 Claims, 8 Drawing Sheets

COMPUTERIZED TRADING SYSTEM

CROSS-REFERENCE TO RELATED APPLICATIONS

This application is a Continuation of application Ser. No. 11/323,943 filed on Dec. 29, 2005, the entire contents of which is herein expressly incorporated by reference.

FIELD OF THE INVENTION

The present invention relates to computerised trading systems and associated methods. In particular, although not exclusively, the present invention relates to computerised trading systems and associated methods which implement trades in basis trading where the two instruments have different and non-universally agreed pricing mechanisms and metrics, such as futures crosses in the European derivative markets.

BACKGROUND OF THE INVENTION

Computerised trading systems which match bids and offers, orders, or other specified requests of parties, in order to make a trade are widely disclosed in the prior art. Some systems provide a user with information about existing bids and offers and enable the user to make a trade, while other systems automatically form a trade from a bid and offer when they are found to match (e.g. when a market price moves such that the bid and offer then match). An example of a system for automatically matching bids and offers for financial instruments according to the prior art has a central server that holds records of all pending bids and offers.

Such computerised trading systems have generally been used to implement single-instrument transactions, such as an interest rate swap. However, other trades exist that link two or more types of instruments. For example, a "spread over" trade hedges an interest rate swap against a future security by trading both instruments simultaneously.

An excellent example of a spread over trade can be found in the US dollar swap market. In the context of a 5 year USD swap, the hedge security used is normally the US Treasury 5 Year note. In a generic sense, a given swap could be hedged against any particular security but, over time, a convention has arisen that the hedge will always be that particular US Treasury note. The reason for this is that this particular security meets the criteria required for a good hedge of the underlying swap trade. Primarily these criteria are:

Yield Correlation—that is, a change in the hedge yield is tightly correlated to a change in the swap yield;

Highly Liquid—the hedge instrument should be able to be traded easily and in large volumes; and Tight Spread—closely related to the liquidity, the hedge instrument needs to have a tight bid/offer spread to minimise the overall cost of the transaction.

When a security meets these criteria, it will make a good hedge for another instrument. This is the case in the US Treasury market.

To assess whether or not a spread over trade is attractive, the yields from the swap and the security must be determined to allow their difference (the spread over yield) to be calculated. It has become the convention in the USD swap market to value spread over trades as simply the difference in yield between the higher swap trade and the lower treasury note trade, or in other words the spread over the treasury note yield. For a bid spread over order to match an offer spread over order, the spread over yields must match.

Determining the yield from a swap is straightforward given the required interest rates. Further, there is a standard price to yield conversion function in the US Treasury market that means there is universal agreement on the yield for a given trade in the Treasury note.

As a result, a trader examining a spread over instrument will see a series of orders at a variety of "prices" where those prices represent a number of basis points difference between the swap trade yield and the Treasury note yield, where a basis point represents one hundredth of a percent.

In Europe, a simple Treasury bond has not presented itself as a good hedge for swap trades. Instead, the Bund Future has become the hedge of choice for European swaps, therefore we focus on this example although the system implements a solution that is generic.

Implementation of a computerised trading system to conduct European spread over trades has been frustrated by the lack of a single accepted price to yield conversion methodology for the Bund Future. Three common methods are "Swap Zero Coupon", "Cheapest to Deliver Forward" and "Cheapest to Deliver". The details of each of these methodologies are publicly available; suffice it to say here that each methodology provides different yields for the same price of the future. However, these are only three of the most common methods and, in addition, participants often arrive at different yields even when using the same method, due to different pricing inputs.

For a computerised trading system to match automatically European spread over trades, it must compare the spread over yields of submitted orders. This requires a standard metric for calculating the security yield to allow determination of a standardized spread over yield else comparisons are meaningless.

In the interests of clarity, the phrase "futures cross" will be used to indicate the equivalent of a USD spread over trade in the European markets. Thus, it is an object of the invention to realise a computerised trading system that automatically matches futures cross orders while allowing flexibility in how any particular participant chooses to determine the yield for the security instrument and hence the spread over yield for the futures cross.

It is convenient for the prices that are used in order to achieve "business level" goals to be as stable as possible. By referring to the complex spread over trade as a spread over the underlying bond, the price volatility of the bond is eliminated from the price volatility of the spread over security, thus making the price more stable. The present invention brings the spread over functionality into the European markets for futures cross. As a result, it is useful to use the spread over nomenclature in the futures cross market.

It is also convention to talk about many interest rate products in terms of yield differentials over some more basic underlying instrument (known as a credit spread, and this convention is something with which the participants in the market are familiar).

Finally, given that the futures cross product has an intrinsic usefulness, there must be a way to enable a participant to examine the product as a whole and rank the orders that exist within the market to select the best one against which to match. The spread over the futures yield is such a way of assigning a price to the futures cross order as a whole.

In the current, voice-brokered environment, traders will provide their price for a futures cross order in terms of two metrics: (1) the price of the futures trade and (2) the yield of the swap. That is, the price of a futures cross order is rarely given in terms of a spread over the underlying yield of the future, in the current voice brokered world. Whilst it is true that brokers might convert this to a spread over price for their own reference, they will only have a "rough" idea of the extent to which the spread over for a given futures cross will match the specific futures price and swap yield of another futures cross order. This is particularly true when one or other of the two orders has to be moved from its original price points in order to match with another order. Traditionally, it is by returning to the client with a specific counterparty's price and yield combination that a broker can determine if a deal will be done.

This "returning" to the customer whose order is being hit is something to be avoided in an automatic matching system since it would mean that the matching engine cannot execute matches as they are found, for example when a movement in market prices results in an offer and bid matching. The solution is to allow a model to be stored internally to allow the matching engine to make the adjustments internally and to recognise the prices at which deals can be done without having to return to the traders for confirmation. The matching engine may be implemented to search for a price that satisfies both parties requirements and allows a deal to be done.

The system is not restricted to executing trades between legal entities however, and can be used to match any willing parties with any counterparty that they see fit, be that a hypothetical construct, individual person, or a logical label standing for anything else.

As well as providing an electronic or computerised trading system implementing the above features, the invention also provides methods of trading according to these features, methods of providing facilities for such trading, and computer readable media carrying computer program code implementing parts or the whole of the system and methods.

SUMMARY OF THE INVENTION

The present invention provides a method of trading futures cross financial instruments and a computerised trading system which can automatically match futures cross orders, both allowing traders certainty of execution at time of order entry.

Orders are received from traders, i.e. users of the system, that are expressed generally either in terms of a standardized spread over yield or a combination of a futures price and a swap yield. Generally the user will have their own preferred methodology for calculating a futures yield form the futures price and, because the swap yield is known, the user-defined spread over yield may be calculated as a consequence of this methodology.

The user will also have provided benchmark parameters. These benchmark parameters are a futures price, a futures yield at that futures price as calculated using their own methodology, and a scaling factor that scales changes in the futures price to changes in the futures yield.

In order to allow comparison of orders submitted by the various traders, the orders as defined by their user-defined spread over yield are converted to standardized spread over yields, using the benchmark parameters and an input futures price. The input futures price may be the last traded price of the futures. An internal function is used to calculate a standardized futures yield when determining the standardized spread over yield. With all orders expressed in terms of standardized spread over yields, matches may be identified and reported back to the users that submitted the orders. The users may convert back the standardized spread over yield into a user-defined spread over yield, i.e. as determined according to their preferred methodology. Orders may be updated each time the last traded price changes.

Alternatively, prices may be automatically generated, used as the input futures price, and matches identified. Another alternative is to take pairs of orders and attempt to find whether there is a futures price that would yield the same standardised spread over yield for the two orders. If such a futures price is found, or if the futures price was automatically generated, the price may be checked to ensure that is acceptable to both traders and perhaps also to the venue hosting the trade.

BRIEF DESCRIPTION OF THE DRAWINGS

Embodiments of the invention will now be described, by way of example only, and with reference to the accompanying drawings, of which:

FIG. 4 shows a user interface window for submitting an order to trade a futures cross;

FIG. 5 shows a window displaying a list of orders submitted by a trader; and

DETAILED DESCRIPTION OF PREFERRED EMBODIMENTS

Figure 1:
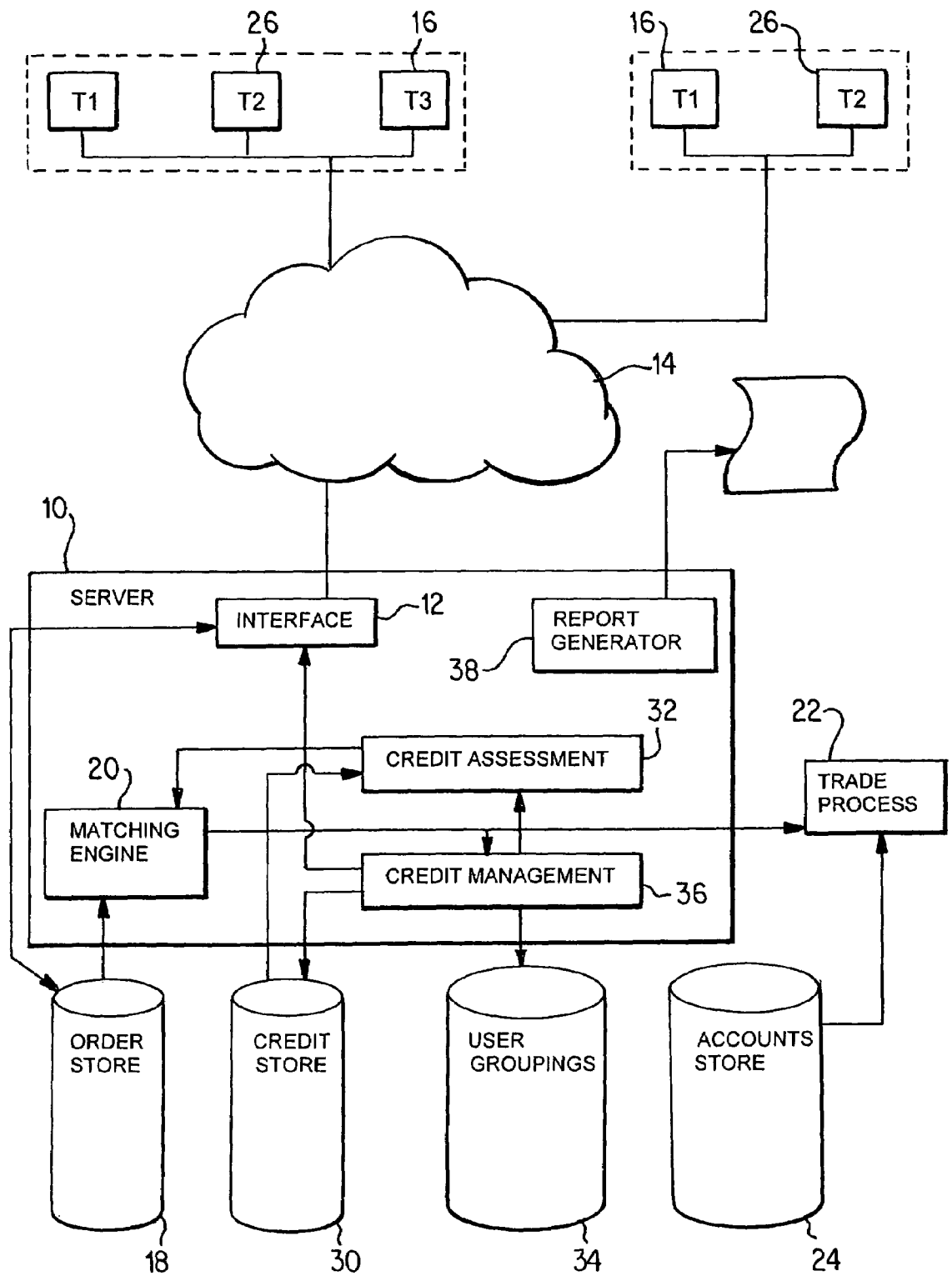
FIG. 1 is a schematic diagram of elements of an electronic trading system embodying the invention.

The present invention provides a computerized trading system and corresponding methods. The described system is intended primarily for trading financial instruments, especially future crosses that comprise a spread of an interest rate swap over a future security. Strategy instruments can exist that are composed of two or more futures cross orders. In the case of a strategy composed of two futures cross orders, one of these orders will involve a purchase of futures and the other will involve a sale of futures. If the same futures contract is involved in both orders these will simply cancel out and the resulting strategy will be a spread between the two swap orders. If the two futures cross orders use different futures then the resulting strategy can be used to create implied orders when combined with other appropriate orders. For example, a strategy can be created from the following two futures cross orders.

Order 1: buy Bund Future, pay 10-year EUR swap

Order 2: sell Bobl Future, receive 5-year EUR swap

The Bobl Future is the European interest-rate hedge instrument of choice in the 5-year sector, in a similar way to the 5-year Treasury Note being the USD interest-rate hedge instrument of choice.

If a further order exists that satisfies one leg of the strategy, such as this:

Order 3: sell Bund Future, receive 10-year EUR swap; then an implied order can be generated:

Order 4 (implied): sell Bobl Future, receive 5-year EUR swap.

This implied order can combine with an opposite real order to create simultaneous trades.

Another example can be created from the following 2 futures crossing orders.

Order 5: buy Bund Future, pay 10-year EUR swap
Order 6: sell Bund Future, receive 15-year EUR swap then an implied order can be generated:

Order 7 (implied): pay 10-year EUR swap, receive 15-year swap.

This implied order can combine with an opposite real strategy order to create simultaneous trades in a similar manner to the previous example and as discussed in detail in U.S. patent application Ser. No. 11/212,465, which is hereby incorporated in its entirety by reference.

The system monitors market prices and, when a price "ticks" (i.e. moves up or down), calculates the effect on stored futures cross orders and determines which orders match as a result of the price tick. The system also provides anonymous trading between parties while providing this automatic matching of orders submitted to the system irrespective of how each party determines the yield from the future security and hence the spread over yield.

Data Standardisation

As noted above, a significant hurdle to overcome is the different methodologies used to relate price to yield for bond securities. These price to yield functions are essentially continuous and therefore, at any particular futures price level, an incremental change in the price will map to an incremental change in the yield that is essentially linear. In reality, the gradient of the price to yield function is not linear and so the marginal change in yield for a high price will be quite different from the marginal change in yield for a low price. However, since we are looking at the marginal price change in a future whose price does not change radically from moment to moment (unless there is some external shock), it is a reasonable assumption to think of a linear representation of marginal change in yield with respect to price.

In order to avoid having to implement and manage many different price to yield functions for all the different participants, the continuous nature of the price to yield curve is relied upon to mean that a participant can specify certain parameters from which a standardized calculation may be used to determine a standardized spread over yield. The standardized calculation may use any of the currently accepted price to yield functions, selected as preferred. This function is referred to as the "internal function", used to provide an internal futures yield and an internal "price" (the spread over yield). The user-defined parameters that must be specified by a participant are:

1. a futures price,
2. the futures yield at that price (as determined using their own preferred methodology), and
3. a scaling factor that scales the number of increments in the futures price that will give one increment in the futures yield at that price level.

Using this information, the spread over yield $\delta_{ai}$ determined by any participant A may be converted into a standardized internal, or benchmark, spread over yield $\delta_m$ using the following $$\delta_m = \delta_{ai} + f_a$$

where $f_a = s_a(p_m - p_{ak}) + (y_m - y_{ak})$ and:

$p_m$ is the futures price where the function used by the participant and an "internal", or benchmark, function used by the system return the same spread over yield (i.e. the price at which a trade may be performed, determined as described below);

$y_m$ is the yield at $p_m$ returned by the internal function;

$s_a$ is the scaling factor entered by participant A;

$p_{ak}$ is the futures price entered by participant A; and $y_{ak}$ is the yield of the future at price $p_{ak}$ entered by the participant, determined according to the formula used by participant A.

By definition, any given futures cross order from any given participant can be transformed to a standardized metric. This allows any particular futures cross order from a participant to be expressed in a standard form and so to be matched to another participant's futures cross order also expressed in standardized form according to varying values of $p_m$, the price of the future. Various values of $p_m$ may be tested and matches in internal spread over yields identified for each price. However, as described in more detail below, it is preferred to use the last traded price (LTP) of the future as $p_m$ and identify matches at the LTP.

Given that all incoming futures cross orders are converted to standardized form for internal storage and matching purposes, this internal representation can be given to all participants without breaching confidentiality obligations. This is because the standardized data does not require any private information from any other participant in order to calculate the form of the data according to the parameters specific to the viewing participant. Using the formula above, at time zero when the futures price is $p_0$ and the yield is $y_0$ (this can be found by extrapolating from the participant's entered parameters), we can express any order $O_{a0}$ in terms of the metrics of participant A as a function of the standardized form of that order $O'_{a0}$, and the participant's price and yield $p_{ak}$, $y_{ak}$ as $$\delta_{a0} = \delta'_{a0} - (s_a(p_o - p_{ak}) + (y_0 - y_{ak})).$$

Therefore, giving the futures price and the internal yield at that price that were used for the calculations in the current order book to a viewing participant allows them to transform the standardized data back into their own form.

A more detailed indication of how the above expressions are derived is provided below in the section headed "Details of Data Standardisation".

The above applies to orders for which the participant allows the execution of the individual legs to occur at prices different to those submitted at time of order entry. These transformable orders are also known as "scaling" futures cross orders. In addition, the system supports non-scaling futures cross orders, i.e. futures cross orders where at the time of order entry the futures price is fixed and the swap yield is fixed. Of course, it is a matter of fact as to whether two non-scaling orders match or not (i.e. two orders having fixed spread over yields result in a unique internal spread over yield for each participant that will either match or not). Clearly, attempts can be made to match scaling orders with non-scaling orders.

System Overview

Referring now to FIG. 1 there is shown, schematically, a suitable architecture for the computerised trading system. The computerised trading system will manage trades in various types of instruments, of which futures cross trades are but one type.

The system comprises a central market server 10 connected via a terminal interface 12 to a plurality of trading terminals 16 via one or more networks 14. A user may submit an order on behalf of a firm (party) from a trading terminal 16 to trade a financial instrument known to the system, such a futures crossing order. To submit an order, it must first be defined by order parameters such as the required instrument, price and size. To allow flexibility, these may be entered in a number of ways. Other parameters stored at the user terminals 16 are used to determine standardized order parameters, such as spread over yield, to allow subsequent matching of orders. Once submitted, the order is placed in an order store 18, where it joins other orders submitted by traders on behalf of a number of different trading parties.

A matching engine 20 seeks to match orders held in the order store 18 to complete trades according to the standardized order parameters. Traders are notified of the matched trades. The user terminal 16 can convert the order details from the standardized order parameters to present the order in terms of the order parameters preferred by that trader. For example, any particular futures cross trade may give different spread over yields because of different methodologies employed to determine the future security yield.

Successfully matched trades are notified to a trade process 22 which initiates completion and settlement of the trade on the basis of details of accounts held in accounts store 24. Individual traders may wish to allocate trades for particular parties to selected accounts, and firms can set up hierarchies of trading accounts to effect this.

The terminal interface 12 provides an application program interface (API) the details of which are made fully available so that firms can prepare their own software for operating user terminals 16, or for integrating the trading system with their own existing systems. This functionality requires the API to provide non-confidential data, and only a limited subset of confidential data, to the user terminals 16. The terminal interface 12 also enables firms to connect their own automatic trading systems, so that orders can be placed and, if necessary amended and withdrawn, automatically.

Credit officers and other users of a firm with special privileges are represented by special terminals 26. These users are entitled by the terminal interface 12, depending on permissions, to modify credit parameters held in the credit store 30 and other parameters relating to the firm and its various components. Access to credit and other sensitive data is carefully controlled by a central permissions scheme according to user types, which include conventional trading users who cannot change credit parameters, trading credit officers who can trade and make any changes to the credit parameters of their trading organisation, and credit officers who can make changes to the credit parameters but cannot trade.

When seeking to match orders to complete a futures cross trade, the matching engine 20 must find futures cross orders which match as judged against the standardized order parameters that are determined according to the order parameters presented by the traders in whatever form they choose.

User Terminal Overview

Figure 2:
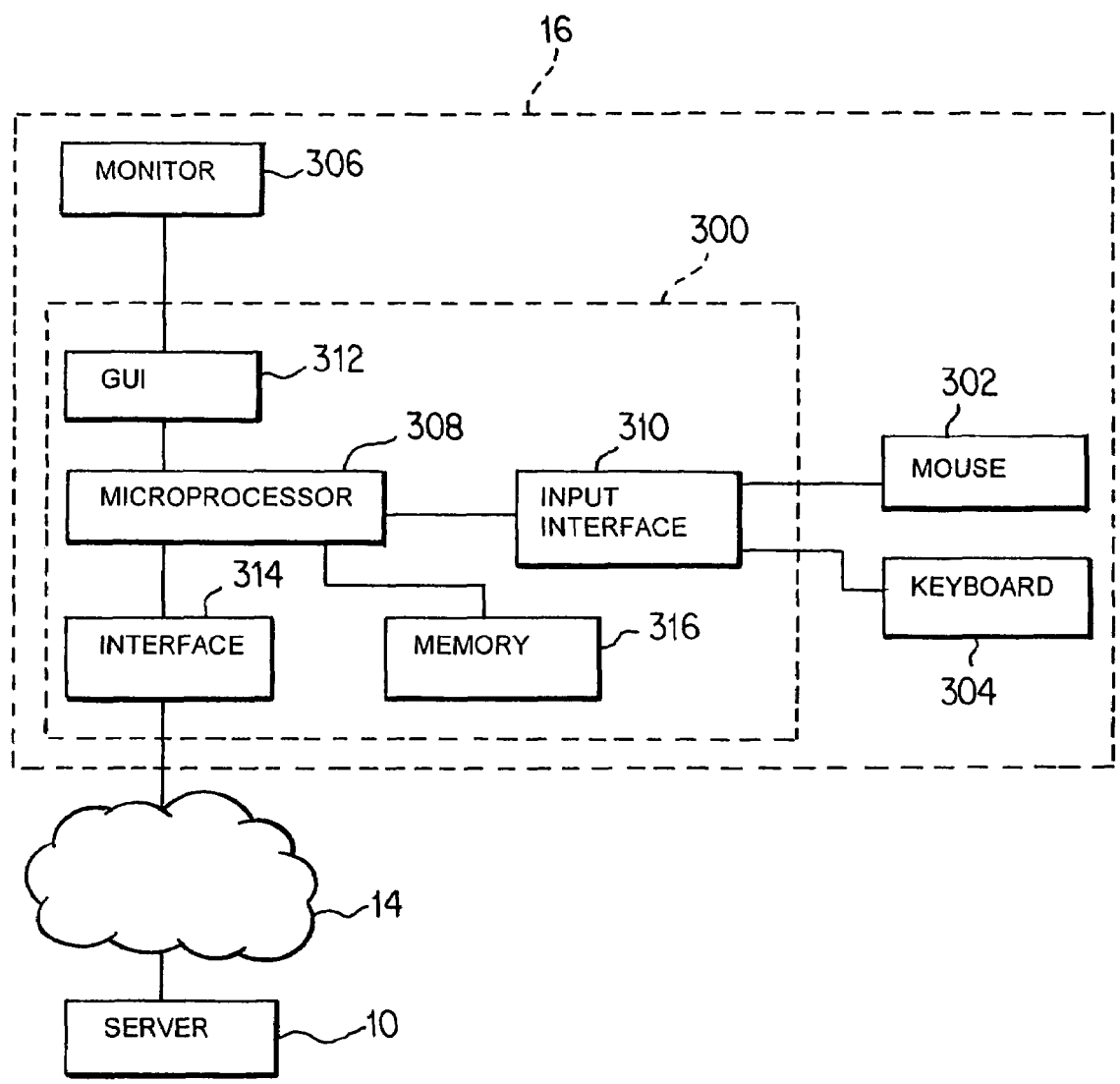
FIG. 2 is a schematic diagram of elements of one or more of the user terminals of FIG. 2.

FIG. 2 shows a schematic representation of an exemplary embodiment of a user terminal 16 of FIG. 1. Although described as a user terminal 16, the following description may also apply to embodiments of the special terminals 26.

The user terminal 16 comprises a personal computer 300 connected to data input devices, such as a mouse 302 and keyboard 304, and to a display such as a monitor 306. The personal computer 300 operates under the direction of a microprocessor 308 that receives inputs from the data input devices 302 and 304 via an input interface 310. The microprocessor 308 can effect displays of information on the monitor 306 via a graphical user interface manager 312. Moreover, the user terminal 16 is connected to the server 10 of the computerised trading system via a network 14. The microprocessor 308 exchanges data over the network 14 via an interface manager 314. The microprocessor 308 has access to a memory 316 for the storage of data. As will be appreciated, the above is but merely a standard arrangement for a network-connected personal computer.

The user terminal 16 is provided with trading software stored in the memory 316 that collects information from the user, performs calculations based on this information and stores that information in the memory 316 as well as sending the information to the server 10.

The microprocessor 308 running the trading software prompts a suitably authorised trader to enter the user defined parameters (a futures price, the futures yield at that price and the scaling factor) via a GUI displayed on the monitor 306. Although these three quantities may be entered manually, software may execute a calculation with reference to the price to yield function used by the trader (and that is also stored in the memory) to derive one or more of the user-defined parameters and pass these parameters to the trading software automatically. The participant's own userdefined parameters are stored in the memory 316 and also sent to the server 10 for storage against the trader/client account held by the server 10.

The microprocessor 308 running the client trading software also allows a trader to enter order details for a futures cross trade through suitable prompts presented via the GUI, as will be described in more detail below.

For each futures cross order, there are a number of attributes that should be stored locally in the memory 316 and sent to the server 10, as follows:

Whether or not the order is a scaling order.

Futures price at the time of the order entry. In the event that the order is specified as a two legged order then the price is the futures price input by the user.

Other attributes are generated by the server 10:

If the order is given purely as a yield differential, then the futures price would be the futures price used to standardise the order's spread over value at the time of order entry. The central order book is ranked by spread over yield differential: orders may be entered as yield differentials, or alternatively as the constituent legs in their native prices from which the server 10 will calculate a yield differential rate.

The "price" of the order, i.e. the standardized internal spread over yield of the order using the above calculations. This is regardless of whether the order is a two legged or yield differential specified order.

Futures price at which this standardisation was executed. For yield differential orders, at order entry this would be the same as the last traded futures price ("LTP") but over time this would change as the futures price changed.

The internal yield of this futures price according to the internal yield calculation. It is not strictly necessary to store this information but it will save recalculating it in a number of other circumstances.

As the market moves, a futures price may be hit that results in the internal spread over yield from two futures cross orders matching. When a futures cross trade has been matched in this way, the standardized details of the trade are sent back to the appropriate traders' user terminals 16. At each user terminal 16, the client trading software can use the user-defined parameters to convert the standardized details including the internal spread over yield back into prices and yields according to their own futures price to yield function, as described above. Thus, the details of the proposed trade can be displayed for the trader to view in the desired form for that trader.

Of course, variations can be made to the above arrangement of server 10 and user terminal 16 without departing from the spirit and scope of the present invention. For example, the transformative standard-to-customised calculations performed by the server 10 may instead be performed by the user terminal 16.

Where a desk of traders operate, each on their own user terminal 16, it may be advantageous to implement a local server with a central memory store in place of individual memories 316. The local server may also perform calculations if desired.

Data Entry

Figure 3:
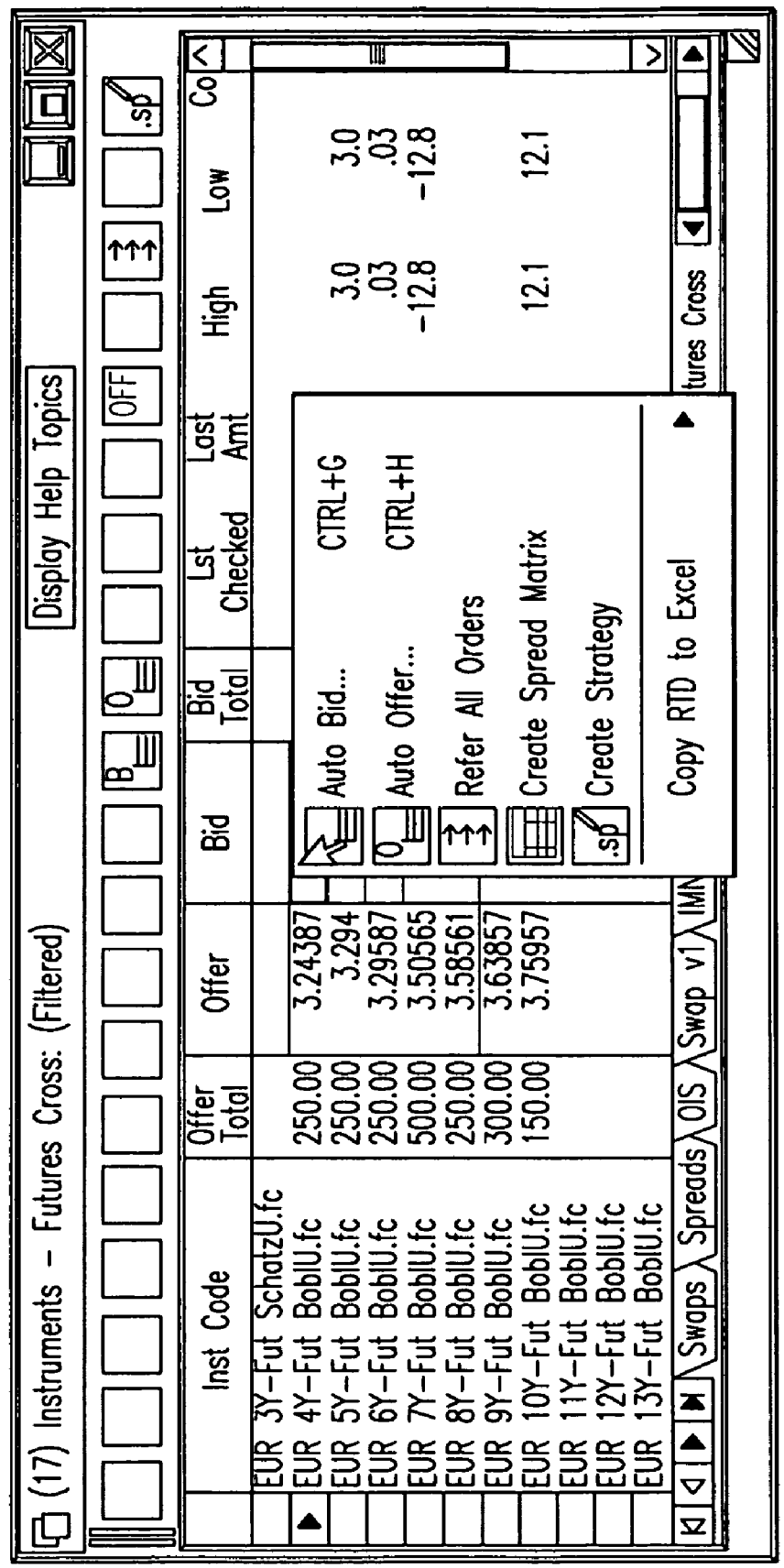
FIG. 3 is a view of financial instruments for trading by the system of FIG. 1.

FIG. 3 shows an "instruments" user interface window 50 available to a user at a trading terminal 16, 26. The instruments window provides a number of tabs 52, at the bottom of the window for selecting views of different product groups of financial instruments available for trade (of which some are in addition to the futures cross trades that are of most interest to the present invention). The main portion of the window displays a scrollable table in which each row corresponds to one instrument of the tabbed product group, with name codes provided in the left most column 54. In the example shown, different types of futures cross orders are displayed in the left hand column. The next two columns 56 provide a summary of the market state in terms of the best price of offer orders presently available for each futures cross type. The columns display an offer total of available amount of the instrument at the best price and the current best offer price. Corresponding fields for bid orders presently available are provided in the next two columns 58.

When displaying a table of futures cross orders, a user can begin the process of submitting a bid or offer by clicking on the row for a particular instrument to bring up a bid/offer selection box 60. Clicking in either "Auto bid" or "Auto offer" brings up an automatic order entry window 70, illustrated for the "Auto bid" option in FIG. 4. This window is automatically populated with default order parameters for a futures cross order.

Figure 4:
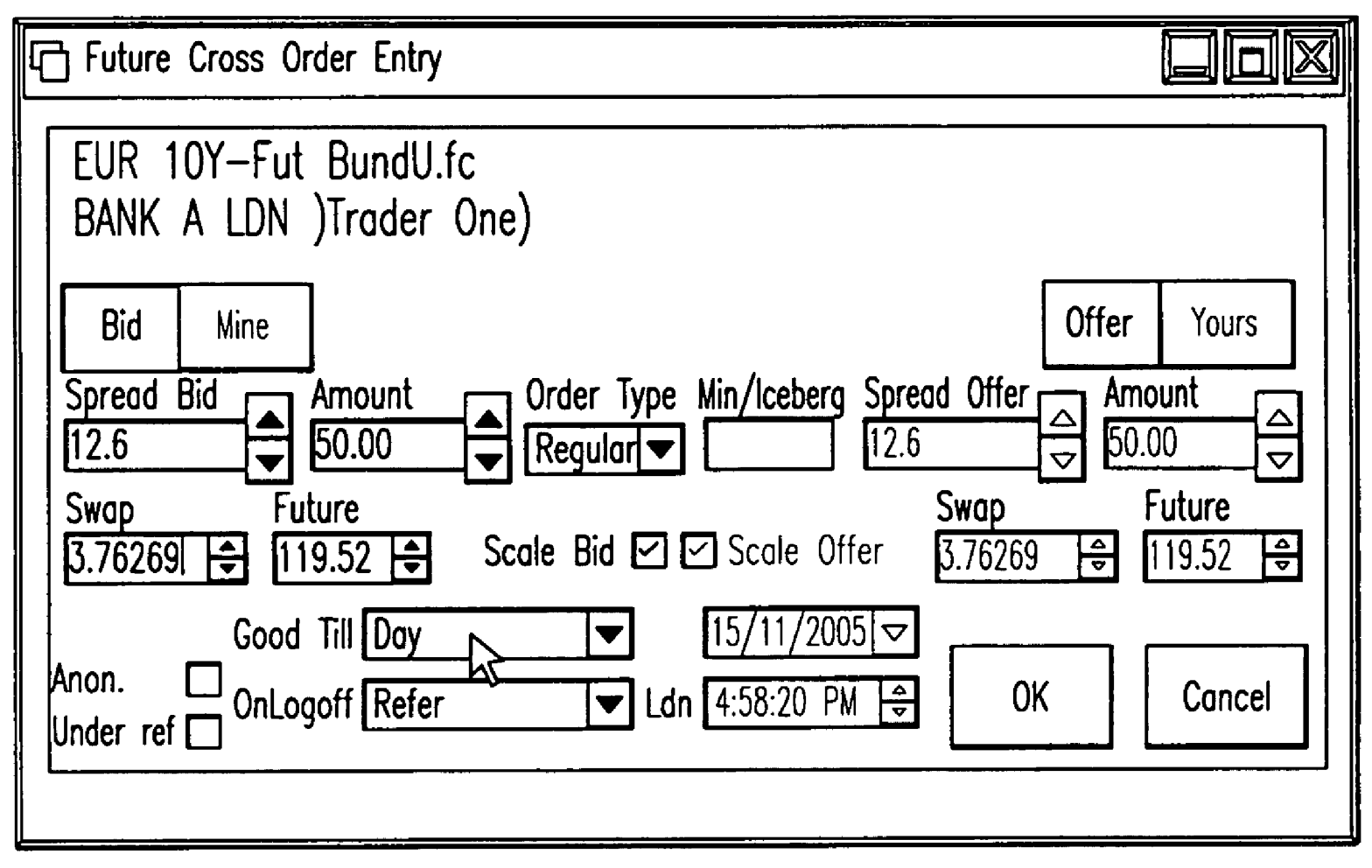

In FIG. 4, the parameters for a bid include checkboxes 73 to indicate whether or not the futures cross order is scaling or non-scaling, a bid "price" 72 that equates to the desired spread over yield, an order quantity 74 (by convention in the European market, the order quantity is the swap quantity although the future quantity may be used as this is derived as a function of the first), a swap price 75, a future price 77, an order type 76, a minimum fill quantity 78 (i.e. the minimum order size that will be accepted if the trade is matched to an aggregated number of counter-trades), a duration 80 (i.e. for how long the proposed bid is good) and an on-logoff behaviour 82 (i.e. what to do with the bid order when the user logs off). The fields for the bid "price" 72 and the pair of swap price 75 and future price 77 are mutually exclusive, i.e. an order is described either by a spread over yield 72 or by a swap price 75 and a future price 77. Thus data entry in one of these fields 72, 75 and 77 will automatically clear any data already entered in a mutually excluded field.

The user can edit the above parameters as desired before submitting the order to the system for matching. If the "Auto offer" option of FIG. 3 is selected, then the offer price and offer amount fields are used instead of the bid price and bid amount in the order entry window 70. Swapping between bid and offer modes can be effected using the buttons 71.

Order types 76 which are available in the present embodiment include regular orders which have no amount conditions, minimum fill orders which the matching engine will only match in a trade if the minimum size is filled (if chosen, field 78 becomes active), all-or-nothing orders which the matching engine will only trade if the full order quantity is filled, and iceberg orders which show only the specified minimum size to the market which is replenished from a hidden order quantity as trades complete (if chosen, field 78 becomes active).

The duration field 80 is used to set a time, or time and date, for expiry of the order. Expiry may additionally be automatic at the end of a trading day, or longer durations may be permitted by the system. The on-logoff behaviour 82 allows the user to specify whether, when logging off from the user terminal 16, the user's order remains active (persists), is withdrawn (purged), or is held in an inactive state (referred).

Figure 5:
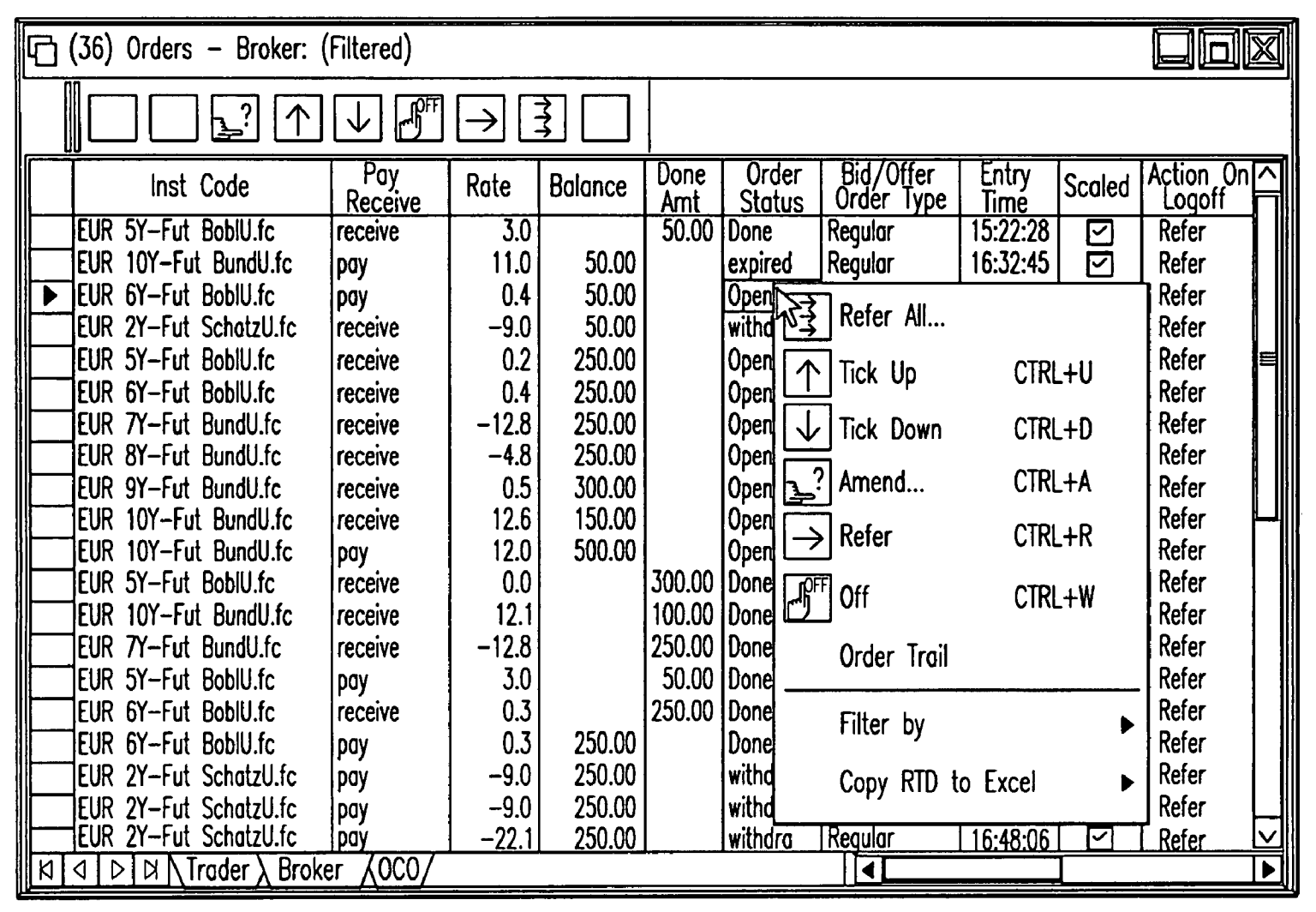

An order can have a status of open, amended, referred, withdrawn or expired. A list of a firm's or user's current orders, including active and referred orders, is provided by an orders window 90 shown in FIG. 5 (not all available columns are displayed in this screen shot). The user can apply filters to reduce the number and types of orders shown. The window provides details, for each order, that includes: the instrument name code, whether the order is a bid or offer (pay/receive on interest rate swap), the price, i.e. the spread-over yield, whether the order is a scaling or non-scaling, price (spread over yield for a futures cross), future price, swap price, and quantity.

The price displayed for a non-scaling order must be treated carefully. For non-scaling orders, different traders have different "current value" opinions, driven by their differing scaling factors. For a non-scaling order, a swap rate should be displayed that corresponds to the swap rate that this order would have if in fact it were a scaling order: this price is calculated using the observing trader's scaling factor.

Other information displayed includes whether the order is visible to brokers working for the system operator ("is public"), and whether the order is shared with other traders on the same desk ("shared"). Orders can be shared as a user configurable default, or on a per order basis. Shared orders can be viewed by all traders on the same desk, and if any order details are amended, order ownership transfers to the trader that actioned the amendment.

Brokers acting for the system operator can be permissioned to enter orders on behalf of traders acting for firms. These brokers cannot amend or action any trader entered order, and traders can only withdraw orders entered by brokers on their behalf. For a broker, futures cross orders are displayed according to the corresponding trader's metrics, thus a display of many futures cross orders may contain values derived in a number of different ways.

A toolbar 92 provides for quick execution of a variety of operations on this and other windows, including (from left to right) auto bid, auto offer, mine (take bid), yours (take offer), implied order, custom spread, amend order, tick order price up, tick order price down, refer order, renew order, refer all orders and withdraw order. In the context of futures cross orders, tick up means increase the spread over yield by one increment, with a similar decrease for tick down. The equivalent effect on the futures price can be found using the scaling factor.

All spread orders are submitted and matched using system default duration ratios displayed in a hedge factor column of the appropriate view of the instruments window 54. These duration ratios are fixed at the start of a trading day, although intra day updates are possible in the event of significant market moves. Spread orders imply into the outright markets of their legs, and outright orders will imply into spread markets.

A combination of two spreads sharing a leg will also imply into their associated combination spread markets. Minimum fill and all-or-nothing spread orders are restricted to either starting or finishing implied transaction chains, and only the primary leg of an all-or-nothing order will imply.

A number of order safety features are provided to help avoid serious trading mistakes and restrict deliberate or accidental trading activity.

Credit Management

Credit limits are applied by each firm to third parties. This limits the amount of trading that may be conducted with any particular third party and is put into place to reduce exposure to financial losses that may occur if the third party were, for example, to go bankrupt.

Further details of credit management are disclosed in our co-pending U.S. patent application Ser. Nos. 11/212,458, 11/212,463 and 11/212,464, the disclosures of which are incorporated herein in their entirety by reference.

Details of Data Standardisation

As noted above, different methodologies are used to relate price to yield for futures. These price to yield functions are essentially continuous and therefore, at any particular futures price level, an incremental change in the price will map to an incremental change in the yield that is essentially linear. The continuous nature of the price to yield curve is relied upon to mean that a participant can specify certain parameters from which a standardized calculation may be used to determine a standardized spread over yield. As a reminder, the user-defined parameters that must be specified by a participant are: a futures price; the futures yield at that price as determined using their own preferred methodology; and a scaling factor that scales the number of increments in the futures price that will give one increment in the futures yield at that price level.

Figure 6A:
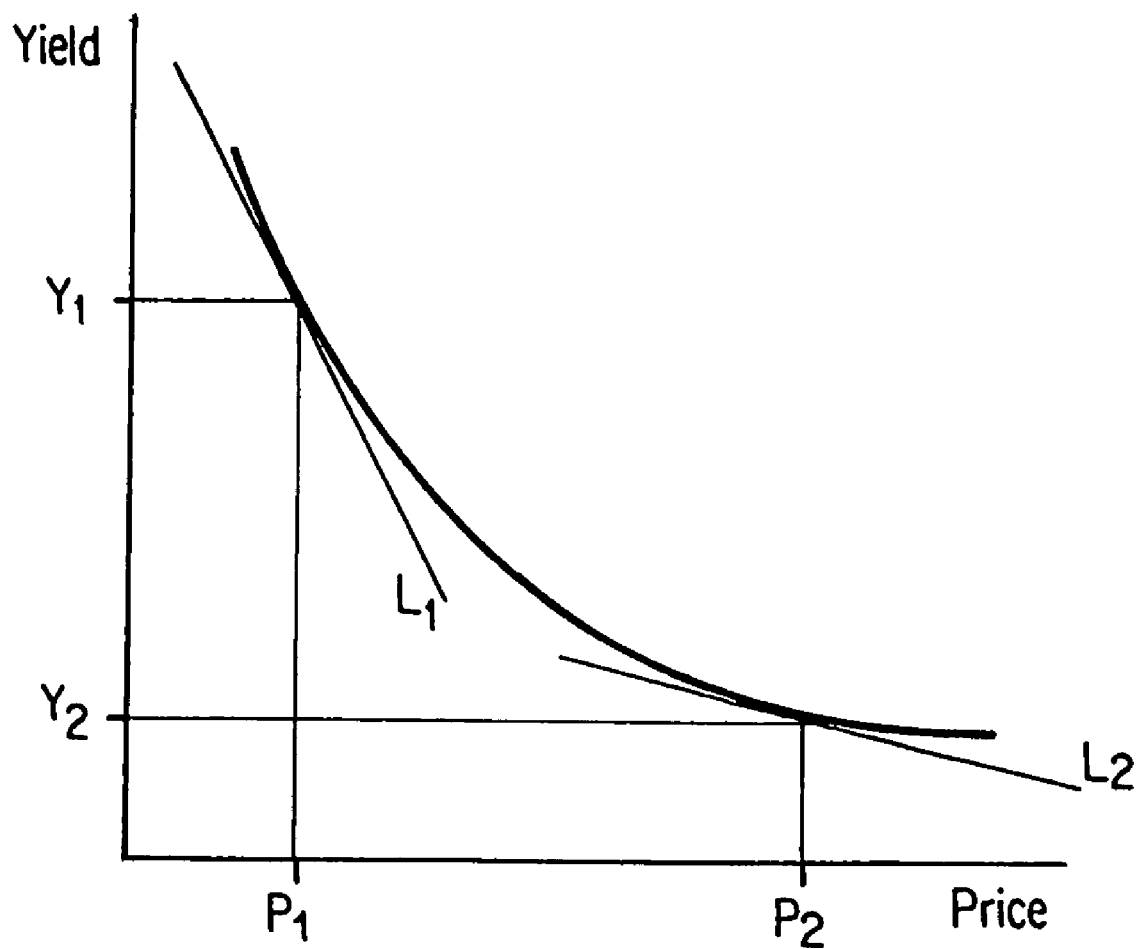
FIG. 6a is a generic price vs. yield curve for the Bund Future showing the yields $Y_1$ and $Y_2$ at respective prices $P_1$ and $P_2$.

FIG. 6a shows a generic price-yield curve where at two different futures prices $P_1$ and $P_2$, the yield curve provides specific futures yields $Y_1$ and $Y_2$ respectively. At the points $(P_1,Y_1$ and $P_2,Y_2)$, the price-yield curve can be approximated as two different lines $L_1$ and $L_2$ with particular gradients (the price tick to yield tick ratio).

Importantly this linear approximation is only valid for relatively narrow bands of prices and as such it may be necessary to move from one linear approximation to another. As a result, it is important to allow the user-defined parameters to be changed interactively since the futures price is not completely immune to shocks that will move the price enough to warrant a shift from one linear approximation to another. Thus, as prices move, a participant may update the user-defined parameters. Alternatively, different bands of user-defined parameters may be initially set that are defined by the price and an upper and lower limit where the associated scaling factor may be applied. The appropriate band may be used according to the current market price.

A further reason to allow editing of the user-defined parameters is that the participant may be measuring factors in their own systems that may change their interpretation of either the specific yield for a given price or the gradient of the curve at that price.

The system has a default futures price to yield conversion function to use for those participants who do not provide their own (thus, the user defined parameters need not be defined by that participant). The default price to yield function is also available for the internal use of the matching engine in order to calculate a baseline spread over yield for determining the matching hierarchy for different orders. Any commonly available methodology may be selected for this default mechanism. In addition, a default scaling factor exists and is used for those participants who do not provide their own.

In order to construct an order book for futures cross securities, all the "user defined" aspects of the incoming orders are eliminated. The orders are then stored in a sequence that can be used for matching and managing the order book on the basis of some formal metric that will allow quick identification of orders whose spread over yield matches. In addition, the metric used is independent of the incremental changes in the futures price so as to avoid recalculating the metric for each value of the underlying futures price.

Figure 6B:
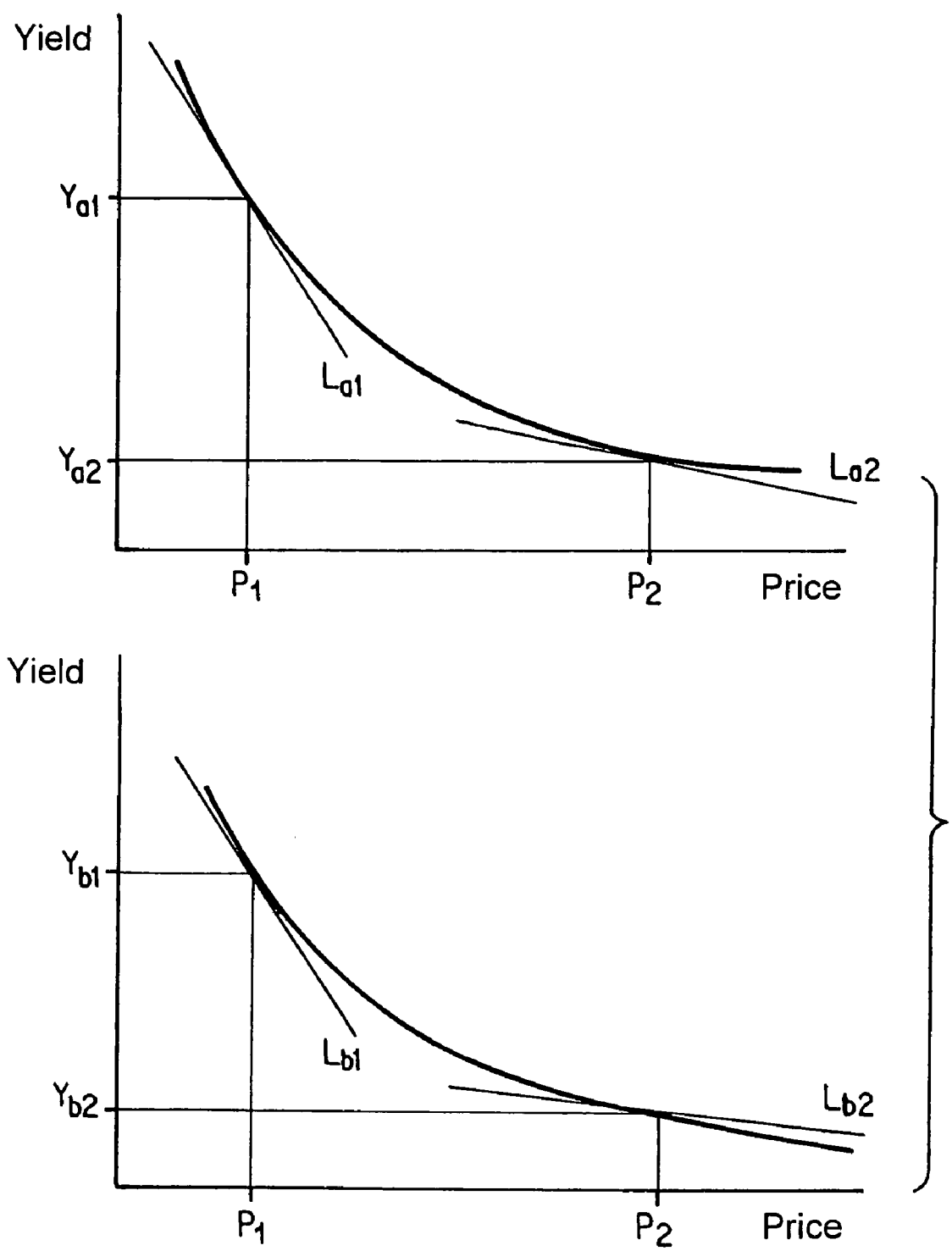
FIG. 6b shows two generic price vs. yield curves like that of FIG. 6a, but as calculated by two participants according to their own price to yield functions.
Figure 6C:
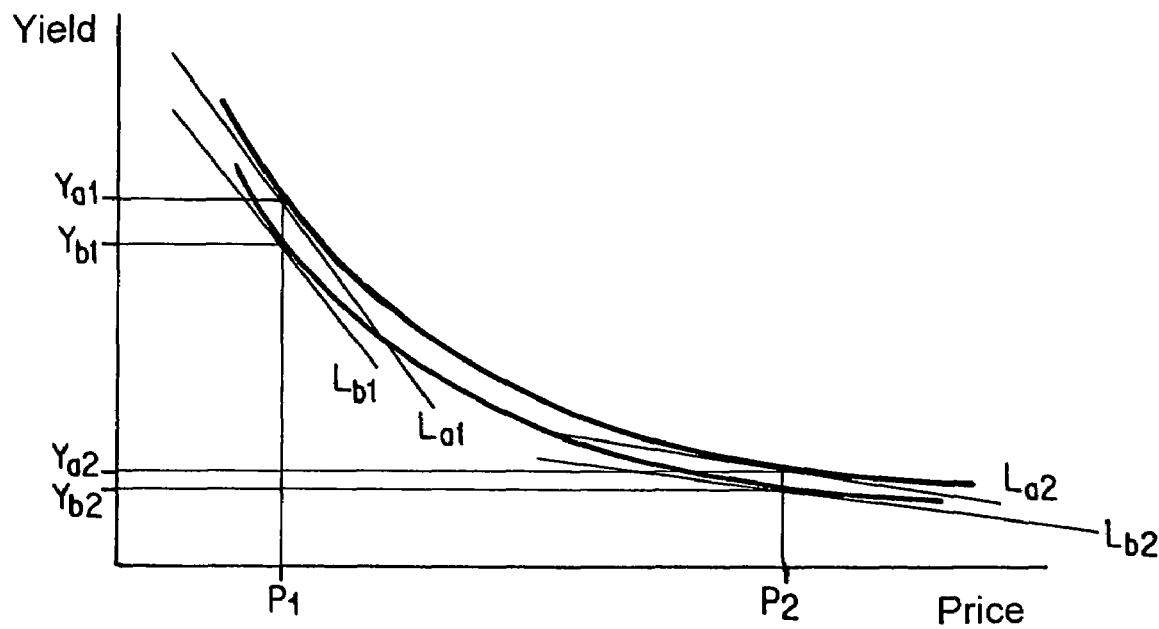
FIG. 6c show the superposition of the two price vs. yield curves of FIG. 6b.

Consider two participants A and B whose theoretical futures yield curves are shown in FIG. 6b. FIG. 6c shows the superposition of the two curves. These examples are representations only, and the empirical difference between curves is unlikely to be so exaggerated in real world scenarios.

In FIG. 6c, at futures price $P_1$ participant A thinks the yield is a little higher ($Y_{a1}$) than does participant B ($Y_{b1}$). Similarly, there are differences should the futures price move to a different part of the curve, say to $P_2$.

In order for the system to allow (or "register") the futures cross, the price at which the futures instrument is executed must meet the criteria set by the venue in which the deal will be registered. At the current time, these deals are registered with Eurex and their rules (which may change, and hence there is a need for flexibility) require that the futures deal can only be registered between the high and low values for the day. As such, the last traded price is used to find matching futures cross orders since this price does, by definition, meet this criterion. It is also possible that the venue may define a hedge ratio which is imposed on these transactions, governing the amount of futures that must be traded when a given quantity of swap is traded.

In order to match, two orders must share the same futures price and the same swap yield, thereby producing the same standardized spread over yield. Matching of the futures leg of the trade will take place at the futures' last traded price and the determination of the yield of the swap leg is dependent on the value derived from the yield curve.

Figure 6D:
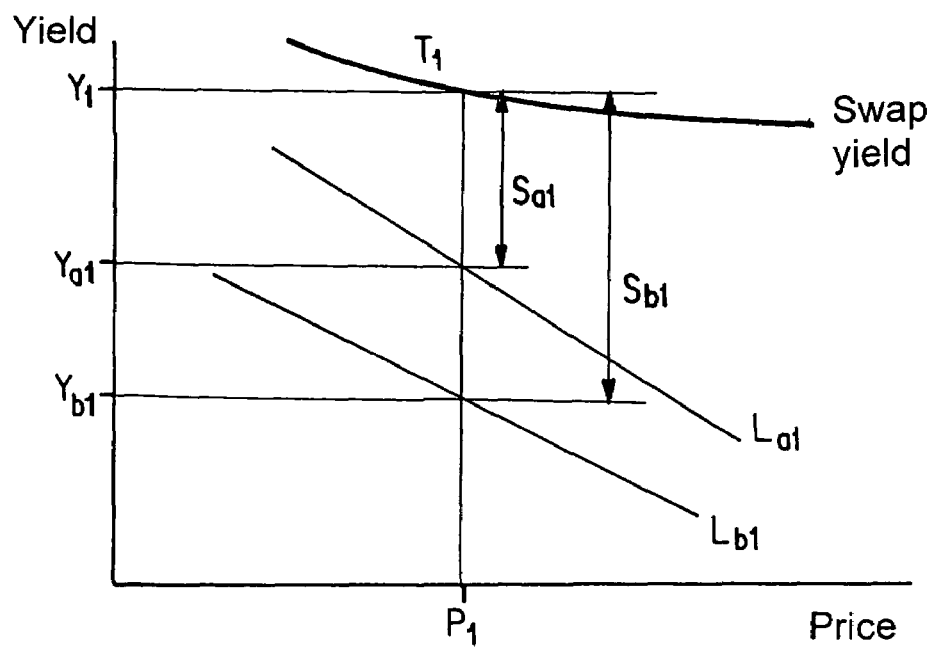
FIG. 6d shows a detail from FIG. 6c around the price $P_1$, also including the swap yield and showing the spread over yields.

FIG. 6d shows a detail from FIG. 6c and includes the swap yield as well. In the example shown in FIG. 6d, the trade $T_1$ will result from the match between the order with spread over yield $S_{a1}$ from participant A ($O_{a1}$) and the order with spread over yield $S_{b1}$ from participant B (Obi) to produce two legs, a futures leg at price $P_1$ and a swap leg with a yield $Y_1$. Storing the two orders, $O_{a1}$ and $O_{b1}$, internally with the spread over yield as shown in FIG. 6d (i.e. as determined by the participants according to their own chosen methodology) will not allow the matching engine 20 to match the trade $T_1$ since the spread over yield S of these two orders that should match is in fact different ($S_{a1}$ and $S_{b1}$).

Since the lines $L_{a1}$ and $L_{b1}$ can have different gradients, it is impossible to consider a comparison between $O_{a1}$ and $O_{a2}$ without making reference to the value of the futures price. Therefore, for any participant, their yield function can be expressed as $$y_{ai}=s_a(p_i-p_{ak})+y_{ak}$$

where:
- $s_a$ is the scaling factor for participant A;
- $y_{ak}$ is the yield of the future at price $p_{ak}$ according to the formula that the participant A uses (if participant A does not specify a formula, the internal values calculated and stored by the system will be used); and
- $y_{ai}$ is the yield for participant A at price $p_i$.

Therefore, for any two participants, say A and B, we can express the approximation of their yield functions as $$y_{ai}=s_a p_i + Y_a(0); \text{ and}$$

$$y_{bi}=s_b p_i + Y_b(0)$$

where, for each participant A and B, $Y_a(0)$ and $Y_b(0)$ are the respective yields at price zero (as mentioned above, this may be found from the parameters they have entered). If we have two futures cross orders i and j from participants A and B respectively to which the participants assign spread over yields $\delta_{ai}$ and $\delta_{bj}$ respectively, then there will be a futures price $p_m$ where the two functions used by the participants return the same spread over yield and at which these two orders match and so can be traded.

$$Y_a(p_m) + \delta_{ai} = Y_b(p_m) + \delta_{bj}$$
$$s_a p_m + Y_a(0) + \delta_{ai} = s_b p_m + Y_b(0) + \delta_{bj}$$
$$s_a p_m - s_b p_m = Y_b(0) - Y_a(0) + (\delta_{bj} - \delta_{ai})$$
$$p_m(s_a - s_b) = Y_b(0) - Y_a(0) + (\delta_{bj} - \delta_{ai})$$
$$p_m = \frac{Y_b(0) - Y_a(0) + (\delta_{bj} - \delta_{ai})}{s_a - s_b}$$

Hence, the system may be proactive and determine the price at which a trade may be done rather than just reacting to changes in the last traded price. However, the determined price must be checked to ensure it meets any criteria laid down by the trading venue.

Care must be taken in that, in practice, spread over orders are quoted in terms of a number of basis points and so a factor of 100 may need to be applied in the calculations.

Solving to find the spread over yield of participant B ($\delta_{bj}$) in terms of the spread over yield of participant A ($\delta_{ai}$) we get $$p_m(s_a-s_b)=Y_b(0)-Y_a(0)+(\delta_{bj}-\delta_{ai})$$
$$p_m(s_a-s_b)=(y_{bk}-s_b p_{bk})-(y_{ak}-s_a p_{ak})+(\delta_{bj}-\delta_{ai})$$
$$p_m(s_a-s_b)=y_{bk}-s_b p_{bk}-y_{ak}+s_a p_{ak}+(\delta_{bj}-\delta_{ai})$$
$$p_m(s_a-s_b)=(y_{bk}-y_{ak})+(s_a p_{ak}-s_b p_{bk})+\delta_{bj}-\delta_{ai}$$
$$\delta_{bj}=p_m(s_a-s_b)-(y_{ak}-y_{bk})-(s_a p_{ak}-s_b p_{bk})+\delta_{ai}$$

By definition, we can scale any given futures cross order from any given participant to a standardized function. This allows any particular spread over order from a participant to be matched to any particular futures cross price (i.e. the spread over yield) by applying the metrics described above.

Substituting the matching futures price $p_m$ for the futures price $p_{bk}$ submitted by participant B, and the internal futures yield $y_m$ for this price, (i.e. the futures yield $y_m$ determined by the methodology adopted by the system for the matching price $p_m$) gives $$\delta_{bj}=p_m(s_a-s_b)-(y_{ak}-y_{bk})-(s_a p_{ak}-s_b p_{bk})+\delta_{ai}$$
$$\delta_m=p_m(s_a-s_b)-(y_{ak}-y_m)-(s_a p_{ak}-s_b p_m)+\delta_{ai}$$
$$\delta_{bj}=p_m s_a - p_m s_b - y_{ak}-y_m-s_a p_{ak}-s_b p_m)+\delta_{ai}$$
$$\delta_{bj}=p_m s_a - s_a p_{ak}-y_{ak}-y_m+\delta_{ai}$$
$$\delta_{bj}=s_a(p_m-p_{ak})+(y_m-y_{ak})+\delta_{ai}$$

where $\delta_m$ represents the internal spread over yield.

This implies that the value of the spread over yield $\delta_m$ at the matching price $p_m$ for this order is the original spread over yield $\delta_{ai}$ plus a factor $f_a$, i.e.

$$\delta_m=\delta_{ai}+f_a$$

where $f_a=s_a(p_m-p_{ak})+(y_m-y_{ak})$.

This factor $f_a$ can be used when first converting a participant's futures cross order to give a standardized spread over yield $\delta_m$ using the system's designated price to yield function. To express the operation in words, for any futures price entered by a participant, the adjustment factor $f_a$ to be added to the participant's spread over yield $\delta_{ai}$ is equal to the difference between the internal yield at that price and the participant's ("constant") yield (i.e. $y_m-y_{ak}$), plus the participant's scaling factor $s_a$ multiplied by the difference between the participant's constant price and the current futures price to be applied to the trade (i.e. $p_m-p_{ak}$).

A re-examination of the factor $f_a$ shows that $$f_a=s_a p_m - s_a p_{ak} - y_{ak}+y_m$$

$$f_a=s_a p_m y_m - (s_a p_{ak}+y_{ak})$$

$$f_a=F(p_m)-k_a$$

In other words, the adjustment factor can be expressed as a function of the price $p_m$ at which the future will be crossed less a constant $k_a$.

This is useful where participants' futures cross orders have already been adjusted to the standardized spread over yield $\delta_m$ and the market's last traded price moves such that there is a change in the price $P_m$ at which the future may be crossed. This can be demonstrated as follows. If a particular order $O_a$ from participant A is subject to a change in futures price from $p_0$ to $p_1$, then the standardized spread over yield $\delta'_m$ at each price is given by $$\delta'_{m0}=\delta_{bj}-(F(p_0)-k_a) \text{ and}$$

$$\delta'_{m1}=\delta_{bj}-(F(p_1)-k_a).$$

The difference in spread over yields $$\begin{aligned}\delta'_{m1}-\delta'_{m0} &= \delta_{bj}-(F(p_1)-k_a)-(\delta_{bj}-(F(p_0)-k_a))\\&=\delta_{bj}-F(p_1)+k_a-\delta_{bj}+F(p_0)-k_a\\&=F(p_0)-F(p_1)\\&=p_0 s_a + y_0 - p_1 s_a - y_1\\&=p_0 s_a - p_1 s_a + y_0 - y_1\\&=s_a(p_0-p_1)+(y_0-y_1)\end{aligned}$$

In other words, the marginal change in standardized spread over yield for a given futures price change is the difference between the internal yields at the two prices plus the difference in price multiplied by the scaling factor of the participant, i.e. $\Delta\delta'_m=s_a\cdot\Delta p+\Delta y_{in}$. Thus, calculating new standardized spread over yields for the orders stored in the order store 18 is straightforward and not particularly computationally expensive.

Although a particular detailed embodiment with some particular variations and alternatives has been described, this should not be taken to limit the invention which may be implemented in a range of other ways. The scope of the invention is rather to be understood from the spirit and scope of the following claims and corresponding equivalents.

The invention claimed is:

1. A method of trading hedged financial instruments in a computerized trading system including a central server and a plurality of trading terminals, the method comprising:

receiving, from the trading terminals, orders for hedged financial instruments from users, each hedged financial instrument comprising at least one interest rate swap hedged against at least one futures contract, each hedged financial instrument having a non-universally agreed pricing mechanism, the orders being expressed in terms of a user-defined spread-over yield, a spread-over yield being the difference between the yield of the at least one interest rate swap and the yield of the at least one futures contract;

calculating at the central server a standardized spread-over yield with reference to the user-defined spread-over yield;

recalculating, at the central server, an updated standardized spread-over yield in response to an updated input futures price by:

calculating the change in the standardized spread-over yield by adding the change in a standardized futures yield to the product of a benchmark scaling factor and the change in input futures price; and adding the change in the standardized spread-over yield to the previous spread-over yield;

expressing at the central server the orders in terms of the standardized spread-over yield;

comparing at the central server the standardized spread-over yields to find matches; and indicating at the trading terminals the orders for which the standardized spread-over yields match.

2. The method of claim 1, wherein users express the orders in terms of a user-defined spread-over yield.

3. The method of claim 1, wherein users express the orders in terms of a futures price and a swap price and the method further comprises calculating, at the central server, the user-defined spread-over yield therefrom.

4. The method of claim 1, wherein the step of calculating comprises calculating, at the central server, the standardized spread-over yield with reference to the user-defined spread-over yield, a benchmark futures price, a benchmark futures yield that corresponds to the futures yield at the benchmark price as calculated according to that user's methodology, and a benchmark scaling factor that scales changes in the benchmark futures price to changes in the benchmark futures yield.

5. The method of claim 4, further comprising using an input futures price to calculate a standardized futures yield according to an internal function, and calculating at the central server, the standardized spread-over yield using the input futures price and the standardized futures yield.

6. The method of claim 5, comprising using the last traded futures price as the input futures price.

7. The method of claim 6, comprising recalculating, at the central server, the orders in terms of a standardized spread-over yield each time the last traded futures price changes; comparing, at the central server, the recalculated standardized spread-over yields to find matches; and indicating to users via the plurality of trading terminals the orders for which the standardized spread-over yields now match.

8. The method of claim 5, comprising incrementing the input futures prices, recalculating, at the central server, the orders in terms of a standardized spread-over yield each time the last traded price changes; comparing, at the central server, the recalculated standardized spread-over yields to find matches; and indicating to users via the plurality of trading terminals the orders for which the standardized spread-over yields now match.

9. The method of claim 5, comprising calculating, at the central server, the standardized spread-over yield by calculating an adjustment factor and adding the adjustment factor to the user-defined spread-over yield, wherein the adjustment factor is calculated by adding the difference between the standardized futures yield and the benchmark futures yield to the product of the benchmark scaling factor parameter and the difference between the benchmark futures price and the input futures price.

10. The method of claim 4, further comprising calculating for a matching order the spread-over yield in terms of the user's own methodology and expressing the matching order at the user's trading terminal in terms of the user-defined spread-over yield.

11. The method of claim 4, comprising taking the submitted orders according to their standardized spread-over yields and the current input futures price and displaying the submitted orders to the user at the user's trading terminal according to user-defined spread-over yields calculated according to the user's own methodology.

12. A method of trading hedged financial instruments in a computerized trading system including a central server and a plurality of trading terminals, the method comprising:

receiving from the plurality of trading terminals orders for hedged financial instruments from users, each hedged financial instrument comprising at least one interest rate swap hedged against at least one futures contract, each hedged financial instrument having a non-universally agreed pricing mechanism, the orders being expressed in terms of a user-defined spread-over yield, a spread-over yield being the difference between the yield of the at least one interest rate swap and the yield of the at least one futures contract;

taking at the central server pairs of orders and determining, at the central server, a futures price at which the orders match, the futures price being determined by calculating a standardized spread-over yield with reference to the user-defined spread-over yield;

checking at the central server that the matching futures price is acceptable;

indicating at the trading terminals the orders for which matches have been found; and for each user, using a benchmark futures price, a benchmark futures yield that corresponds to the futures yield at the benchmark price as calculated according to that user's methodology, and a benchmark scaling factor that scales changes in the benchmark futures price to changes in the benchmark futures yield to determine a futures yield for a futures price of zero according to the user's methodology, and determining, at the central server, the matching futures price by adding the difference between the users' futures yields at price zero to the difference between the users' user-defined spread-over yields divided by the difference in benchmark scaling factors.

13. A computerized trading system for use in trading hedged financial instruments between users, the system comprising:

a computerized order store programmed to receive orders for hedged financial instruments from users, each hedged financial instrument comprising at least one interest rate swap hedged against at least one futures contract, each hedged financial instrument having a non-universally agreed pricing mechanism, the orders being expressed in terms of a user-defined spread-over yield, a spread-over yield being the difference between the yield of the at least one interest rate swap and the yield of the at least one futures contract, and to record standardized order parameters defining the orders submitted by the users for trading the hedged financial instruments;

a computerized order matching engine programmed to:
receive standardized order parameters,
generate trades by matching the standardized order parameters including
at least a standardized order spread-over yield, calculated with reference to the user-defined spread-over yield, against those held in respect of other orders contained in the order store, and
indicate a match when one is found;

a computerized data output programmed to output matched order data relating to the indicated matched order in terms of the standardized order parameters; and an arithmetic unit programmed to recalculate an updated standardized spread-over yield in response to an updated input futures price by:
calculating the change in the standardized spread-over yield by adding the change in a standardized futures yield to the product of a benchmark scaling factor and the change in input futures prices; and
adding the change in the standardized spread-over yield to the previous spread-over yield.

14. The system of claim 13, further comprising:
a user details store arranged to store benchmark parameters submitted by a user using the computerized trading system, including a benchmark futures price, a benchmark futures yield that defines the futures yield at the benchmark futures price, and a benchmark scaling factor that defines the scaling between changes in the benchmark futures price and the benchmark futures yield; and
wherein the arithmetic unit is further programmed to:
receive orders from the parties defined by user-defined order parameters,
receive the benchmark futures price, the benchmark futures yield and the benchmark scaling factor stored for that party in the user details store, and
calculate the standardized order parameters that define the order, including the standardized order spread-over yield using the benchmark future price, the benchmark futures yield and the benchmark scaling factor;
and wherein the order store is further programmed to record the standardized order parameters calculated by the arithmetic unit.

15. The system of claim 14, wherein the arithmetic unit is programmed to receive an order defined by a user-defined spread-over yield.

16. The system of claim 14, wherein the arithmetic unit is arranged programmed to
receive an order defined by a user-defined order futures price and a user-defined order swap price, and
calculate a user-defined order spread-over yield using the user-defined parameters.

17. The system of claim 15, wherein the arithmetic unit is programmed to calculate the standardized spread-over yield for an input futures price.

18. The system of claim 17, wherein the input futures price is the last traded price of the futures.

19. The system of claim 17, wherein the input futures price is incremented and the arithmetic unit is arranged programmed to calculate the standardized order spread-over yield at each increment.

20. The system of claim 17, wherein the arithmetic unit is programmed to calculate a standardized futures yield from the input futures price using an internal function.

21. The system of claim 20, wherein the arithmetic unit is programmed to calculate the standardized order spread-over yield using the input futures price, the standardized futures yield, the user-defined spread-over yield, the benchmark futures price, the benchmark futures yield and the benchmark scaling factor.

22. The system of claim 21, wherein the arithmetic unit is programmed to calculate the standardized order spread-over yield by adding an adjustment factor to the user-defined spread-over yield, the adjustment factor equaling the difference between the standardized futures yield and the benchmark futures yield, plus the benchmark scaling factor parameter multiplied by the difference between the benchmark futures price and the input futures price.

23. The system of claim 16, wherein the arithmetic unit is programmed to calculate the standardized spread-over yield for an input futures price.

24. The system of claim 23, wherein the input futures price is the last traded price of the futures.

25. The system of claim 23, wherein the input futures price is incremented and the arithmetic unit is programmed to calculate the standardized order spread-over yield at each increment.

26. The system of claim 23, wherein the arithmetic unit is programmed to calculate a standardized futures yield from the input futures price using an internal function.

27. The system of claim 26, wherein the arithmetic unit is programmed to calculate the standardized order spread-over yield using the input futures price, the standardized futures yield, the user-defined spread-over yield, the benchmark futures price, the benchmark futures yield and the benchmark scaling factor.

28. The system of claim 27, wherein the arithmetic unit is programmed to calculate the standardized order spread-over yield by adding an adjustment factor to the user-defined spread-over yield, the adjustment factor equaling the difference between the standardized futures yield and the benchmark futures yield, plus the benchmark scaling factor parameter multiplied by the difference between the benchmark futures price and the input futures price.

29. The system of claim 15, wherein the arithmetic unit is programmed to search for matching orders by taking two orders, determining a match futures price where the standardized spread-over yield of the two orders is equal and checking whether the match futures price is acceptable.

30. The system of claim 29, wherein the arithmetic unit calculates for the users associated with the two orders a price zero yield by scaling the futures yield to a futures price of zero using the benchmark scaling factor, and wherein the arithmetic unit calculates the match futures price by adding the difference in the users' price zero yield to the difference in user-defined spread-over yield, and dividing this sum by the difference in benchmark scaling factors.

31. The system of claim 16, wherein the arithmetic unit is programmed to search for matching orders by taking two orders, determining a match futures price where the standardized spread-over yield of the two orders is equal and checking whether the match futures price is acceptable.

32. The system of claim 31, wherein the arithmetic unit calculates for the users associated with the two orders a price zero yield by scaling the futures yield to a futures price of zero using the benchmark scaling factor, and wherein the arithmetic unit calculates the match futures price by adding the difference in the users' price zero yield to the difference in user-defined spread-over yield, and dividing this sum by the difference in benchmark scaling factors.

33. The system of claim 13, further comprising a display for displaying at least some of the orders stored in the computerized order store in terms of their standardized spread-over yield.

34. The system of claim 14, further comprising a conversion unit programmed to:
receive the matched order data from the data output that relates to the indicated matched order in terms of the standardized order parameters,
receive the benchmark futures price parameter, the benchmark futures yield parameter and the benchmark scaling factor parameter from the user details store,
convert the matched order data to relate to the matched order in terms of the user-defined order parameters, and
provide the converted matched order data to the user.

35. A computerized remote user terminal for connection to the computerized trading system comprising a computerized order store programmed to receive orders for hedged financial instruments from users, each hedged financial instrument comprising at least one interest rate swap hedged against at least one futures contract, each hedged financial instrument having a non-universally agreed pricing mechanism, the orders being expressed in terms of a user-defined spread-over yield, a spread-over yield being the difference between the yield of the at least one interest rate swap and the yield of the at least one futures contract, and to record standardized order parameters defining the orders submitted by the users for trading the hedged financial instruments; computerized order matching engine programmed to: receive standardized order parameters, generate trades by matching the standardized order parameters including at least a standardized order spread-over yield, calculated with reference to the user-defined spread-over yield, against those held in respect of other orders contained in the order store, and indicate a match when one is found; and a computerized data output programmed to output matched order data relating to the indicated matched order in terms of the standardized order parameters; and an arithmetic unit programmed to recalculate an updated standardized spread-over yield in response to an updated input futures price by calculating the change in the standardized spread-over yield by adding the change in a standardized futures yield to the product of a benchmark scaling factor and the change in input futures price; wherein the standardized futures yield is calculated from the input futures price according to an internal function, and the benchmark scaling factor scales changes in a benchmark futures price to changes in a benchmark futures yield, the benchmark futures yield corresponding to the futures yield at the benchmark price as calculated according to the user's methodology; and adding the change in the standardized spread-over yield to the previous spread-over yield, via a computer network, the computerized remote user terminal comprising:
a computerized communication unit programmed to communicate benchmark parameters for hedged financial instruments, entered by the user to the computerized trading system, the benchmark parameters including a benchmark futures price, a benchmark futures yield that defines the futures yield at the futures price, and a benchmark scaling factor that defines the scaling between changes in the futures price parameter and in the future yield parameter.

36. The remote user terminal of claim 35, wherein the communication unit is further arranged programmed to communicate details of an order entered by a user to the computerized trading system, including a user-defined spread-over yield of the order.

37. The remote user terminal of claim 35, further comprising a computerized local store programmed to store the benchmark futures price, benchmark futures yield and the benchmark futures scaling factor to the computerized trading system.

38. The remote user terminal of claim 37, further comprising an arithmetic unit programmed to receive details of an order entered by a user including a user spread-over yield and to calculate a standardized spread-over yield using the benchmark futures price parameter, the benchmark futures yield parameter, the benchmark scaling factor parameter stored in the computerized local store and an input futures price; and wherein the communication unit is further programmed to communicate the standardized spread-over yield to the computerized trading system.

39. The remote user terminal of claim 38, wherein the input futures price is received from the computerized trading system.

40. The remote user terminal of claim 39, wherein details of orders are received from the computerized trading system, the details including a standardized spread-yield and an input futures price used to obtain that standardized spread-over yield, and wherein the arithmetic unit calculates the orders in terms of a user-defined spread-over yield using the benchmark futures price parameter, the benchmark futures yield parameter, the benchmark scaling factor parameter stored in the computerized local store and the input futures price.

41. A computerized trading system for use in trading hedged financial instruments between users, the computerized trading system comprising:
a central server comprising:
computerized order store programmed to receive orders for hedged financial instruments, each hedged financial instrument comprising at least one interest rate swap hedged against at least one futures contract, each hedged financial instrument having a non-universally agreed pricing mechanism, the orders being expressed in terms of a user-defined spread-over yield, a spread-over yield being the difference between the yield of the at least one interest rate swap and the yield of the at least one futures contract, and to record standardized order parameters defining the orders submitted by the users for trading the hedged financial instruments;
a computerized order matching engine programmed to receive standardized order parameters, to generate trades by matching the standardized order parameters including at least a standardized order spread-over yield, calculated with reference to the user-defined spread-over yield, against those held in respect of other orders contained in the order store, and to indicate a match when one is found; and
a computerized data output programmed to output matched order data relating to the indicated matched order in terms of the standardized order parameters; and
an arithmetic unit programmed to recalculate an updated standardized spread-over yield in response to an updated input futures price by calculating the change in the standardized spread-over yield by adding the change in a standardized futures yield to the product of a benchmark scaling factor and the change in input futures price; and a computerized remote user terminal for connection to the computerized trading system via a computer network, the computerized remote user terminal comprising: a computerized communication unit programmed to communicate benchmark parameters entered by a user to the computerized trading system, the benchmark parameters including a benchmark futures price, a benchmark futures yield that defines the futures yield at the futures price, and a benchmark scaling factor that defines the scaling between changes in the futures price parameter and in the future yield parameter.

42. A computer program that, when executed by a networked computer system including a central server and a plurality of trading terminals, causes the networked computer system to:

receive from the plurality of trading terminals, orders for hedged financial instruments from users, each hedged financial instrument comprising at least one interest rate swap hedged against at least one futures contract, each hedged financial instrument having a non-universally agreed pricing mechanism, the orders being expressed in terms of a user-defined spread-over yield, a spread-over yield being the difference between the yield of the at least one interest rate swap and the yield of the at least one futures contract;

calculate at the central server a standardized spread-over yield with reference to the user-defined spread-over yield;

recalculate, at the central server, an updated standardized spread-over yield in response to an updated input futures price by:

calculating the change in the standardized spread-over yield by adding the change in a standardized futures yield to the product of a benchmark scaling factor and the change in input futures price; and adding the change in the standardized spread-over yield to the previous spread-over yield;

express at the central server the orders in terms of the standardized spread-over yield;

compare at the central server the standardized spread-over yields to find matches; and indicate at the trading terminals the orders for which the standardized spread-over yields match.

43. A computer program product having recorded thereon a computer program which, when executed by a networked computer system including a central server and a plurality of trading terminals, causes the networked computer system to:

receive from the plurality of trading terminals orders for hedged financial instruments, each hedged financial instrument comprising at least one interest rate swap hedged against at least one futures contract, each hedged financial instrument having a non-universally agreed pricing mechanism, the orders being expressed in terms of a user-defined spread-over yield, a spread-over yield being the difference between the yield of the at least one interest rate swap and the yield of the at least one futures contract;

calculate at the central server a standardized spread-over yield with reference to the user-defined spread-over yield;

recalculate, at the central server, an updated standardized spread-over yield in response to an updated input futures price by:

calculating the change in the standardized spread-over yield by adding the change in a standardized futures yield to the product of a benchmark scaling factor and the change in input futures price; and adding the change in the standardized spread-over yield to the previous spread-over yield;

express at the central server the orders in terms of the standardized spread-over yield;

compare at the central server the standardized spread-over yields to find matches; and indicate at the trading terminals the orders for which the standardized spread-over yields match.

44. The method of claim 1, wherein the standardized futures yield is calculated from the input futures price according to an internal function, and the benchmark scaling factor scales changes in a benchmark futures price to changes in a benchmark futures yield, the benchmark futures yield corresponding to the futures yield at the benchmark price as calculated according to the user's methodology; and adding the change in the standardized spread-over yield to the previous spread-over yield.

45. The computerized trading system of claim 13, wherein the standardized futures yield is calculated from the input futures price according to an internal function, and the benchmark scaling factor scales changes in a benchmark futures price to changes in a benchmark futures yield, the benchmark futures yield corresponding to the futures yield at the benchmark price as calculated according to the user's methodology; and adding the change in the standardized spread-over yield to the previous spread-over yield.

46. The system of claim 41, wherein the standardized futures yield is calculated from the input futures price according to an internal function, and the benchmark scaling factor scales changes in a benchmark futures price to changes in a benchmark futures yield, the benchmark futures yield corresponding to the futures yield at the benchmark price as calculated according to the user's methodology; and adding the change in the standardized spread-over yield to the previous spread-over yield.

47. The computer program product of claim 42, wherein the standardized futures yield is calculated from the input futures price according to an internal function, and the benchmark scaling factor scales changes in a benchmark futures price to changes in a benchmark futures yield, the benchmark futures yield corresponding to the futures yield at the benchmark price as calculated according to the user's methodology; and adding the change in the standardized spread-over yield to the previous spread-over yield.

48. The computer program product of claim 43, wherein the standardized futures yield is calculated from the input futures price according to an internal function, and the benchmark scaling factor scales changes in a benchmark futures price to changes in a benchmark futures yield, the benchmark futures yield corresponding to the futures yield at the benchmark price as calculated according to the user's methodology; and adding the change in the standardized spread-over yield to the previous spread-over yield.

* * * * *